United States Patent [19]

Gilcher

[11] E Re. 29,896

[45] Reissued Jan. 30, 1979

[54] INTRUSION DETECTION SYSTEM

[75] Inventor: Heinz Gilcher, Export, Pa.

[73] Assignee: Westinghouse Electric Corp., Pittsburgh, Pa.

[21] Appl. No.: 719,500

[22] Filed: Sep. 1, 1976

Related U.S. Patent Documents

Reissue of:

[64] Patent No.: 3,846,780
Issued: Nov. 5, 1974
Appl. No.: 382,264
Filed: Jul. 24, 1973

[51] Int. Cl.[2] ..... G08B 13/16
[52] U.S. Cl. ..... 340/261; 340/17
[58] Field of Search ..... 340/258 D, 261, 17

[56] References Cited

U.S. PATENT DOCUMENTS

| | | | |
|---|---|---|---|
| 2,649,579 | 8/1953 | Alexander | 340/17 |
| 2,787,784 | 4/1957 | Meryman et al. | 340/258 R |
| 2,837,082 | 6/1958 | Elliott et al. | 340/17 |
| 2,965,877 | 12/1960 | Stein et al. | 340/17 |
| 3,109,165 | 10/1963 | Bagno | 340/261 |
| 3,750,127 | 7/1973 | Ayers et al. | 340/261 |
| 3,763,482 | 10/1973 | Burney et al. | 340/261 |
| 3,889,230 | 6/1975 | Knott et al. | 340/17 |

FOREIGN PATENT DOCUMENTS

| | | |
|---|---|---|
| 1209506 | 10/1970 | United Kingdom. |
| 1278249 | 6/1972 | United Kingdom. |

*Primary Examiner*—David L. Trafton
*Attorney, Agent, or Firm*—M. P. Lynch

[57] ABSTRACT

A wire comprised of an electrical conductor enclosed within insulation, is loosely positioned relative to an electrically conductive member. This combination is positioned to monitor disturbances caused by the intrusion of the protected area. The relative movement of the wire and the electrically conductive member caused by intrusion disturbances produces an electrical signal which is attributable to a capacitance change. The signal can be realized from either the electret characteristic of the wire or it can be realized by the application of a d-c bias voltage to the combination. A signal developed by the combination in response to a mechanical disturbance includes a low frequency and a high frequency component. The low frequency component, attributable to a "strain mode" of operation, developed by the displacement of the wire relative to the electrically conductive member by mechanical deflection of the conductive member whereas the high frequency component, attributable to an "acceleration mode" of operation, results from the vibration of the wire relative to the conductive member. The high frequency component code is comparable to a "ringing" condition much the same as is experienced by an accelerometer.

6 Claims, 4 Drawing Figures

INTRUSION DETECTION SYSTEM

Matter enclosed in heavy brackets [ ] appears in the original patent but forms no part of this reissue specification; matter printed in italics indicates the additions made by reissue.

BACKGROUND OF THE INVENTION

A typical prior art intrusion detection system for monitoring a protected area is described in detail in U.S. Pat. No. 3,438,021 issued Apr. 8, 1969. In this system a pair of fluid filled resilient tubes are buried beneath the surface of the ground and associated pressure transducers develop output signals indicative of pressure changes representing the movement of the intruders. While this system provides a valuable and reliable technique for detecting intruders, it is relatively expensive and difficult to install, and requires treatment of the earth to preserve sensitivity under frozen ground conditions.

Recent efforts to utilize coaxial cables in this buried configuration have also failed due to the lack of sensitivity of the coaxial cables resulting from the tight packaging of the wire within the cable which effectively prevents movement of the conducting elements relative to one another in response to intrusion disturbances. The inherent compactness and tightness of the fabrication of a coaxial cable thus limits the output of the co-axial operation to a low frequency signal thus limiting the sensitivity of such a system and rendering it unacceptable in frozen ground applications.

SUMMARY OF THE INVENTION

There is described herein a preferred embodiment of a novel detection system utilizing an insulated electrical wire loosely positioned within an electrically conductive tube member having an inside diameter substantially greater than the diameter of the wire. The primary mechanism of operation is a change of capacity between the wire and the tube produced by mechanical disturbance of the wire within the tube. The change in capacitance is transformed into a voltage signal which can be the result of an inherent electret characteristic of the wire developed during fabrication of the wire or can be provided or enhanced by the further application of a bias voltage to the wire. A charge is developed by the electret characteristic of the insulation or the d-c bias voltage and a change in capacitance produced by a mechanical disturbance produces an electrical signal. The loose positioning of the wire within the tube member causes the wire to contact the wall of the tube member at random and intermittent locations. In the event the combination of the tube member and wire is positioned beneath the surface of the ground, the wire will be displaced relative to the tube in response to surface disturbances and an output signal will be produced which includes both a low frequency and high frequency component. Due to the fact the wire is significantly closer to one wall of the tube than the opposite wall of the tube, the variation of capacitance produced by displacement of the wire relative to the near wall will be significantly greater than the variation in capacitance due to displacement of the wire relative to the far wall.

This wire-in-tube detection configuration provides advantages over prior art detection configurations for buried systems in that it does not require intimate contact with the soil to insure sensitivity.

DESCRIPTION OF THE DRAWINGS

The invention will become readily apparent from the following exemplary description in connection with the accompanying drawings.

DESCRIPTION OF THE PREFERRED EMBODIMENT

It has been determined experimentally through extensive testing that a significant improvement in intrusion detection systems can be achieved through the use of commercially available insulated electrical wire loosely positioned in contact with an electrically conductive member. A loose contact between the wire and the electrically conductive member permits free movement of the wire relative to the electrically conductive member in response to mechanical disturbance of the conductive member produced by the intrusion. Change in capacitance caused by the movement of the wire relative to the electrically conductive member is transformed into an electrical signal exhibiting a low frequency and/or a high frequency component of sufficient magnitude to permit identification of an intrusion. The electrical signal is developed by either applying a bias voltage to the wire or by utilizing an inherent electret characteristic of the insulation which is developed in the fabrication of commercially available wire.

The electret characteristic found in dielectric insulation which covers some commercially available electrical wire is a characteristic produced during the fabrication of the wire which establishes an electrical charge condition in the dielectric material. A common use of the electret characteristic is in the electret-foil capacitor microphone. In this microphone the electret is a MYLAR film that is metalized on its outer side. The electret characteristic eliminates the need for a d-c bias voltage.

The high and low frequency components capable of being developed by the combination of the loosely positioned wire relative to the electrically conductive member in response to an intrusion disturbance, are both produced as a result in a change in capacitance developed in the vicinity of the intrusion.

The high frequency component, attributable to an acceleration mode of operation, results from the vibration of the wire relative to the electrically conductive member while the low frequency component, which is attributable to a "strain mode" of operation results from the deflection of the electrically conductive member relative to the wire in response to the weight or pressure of an intrusion.

Figure 1:
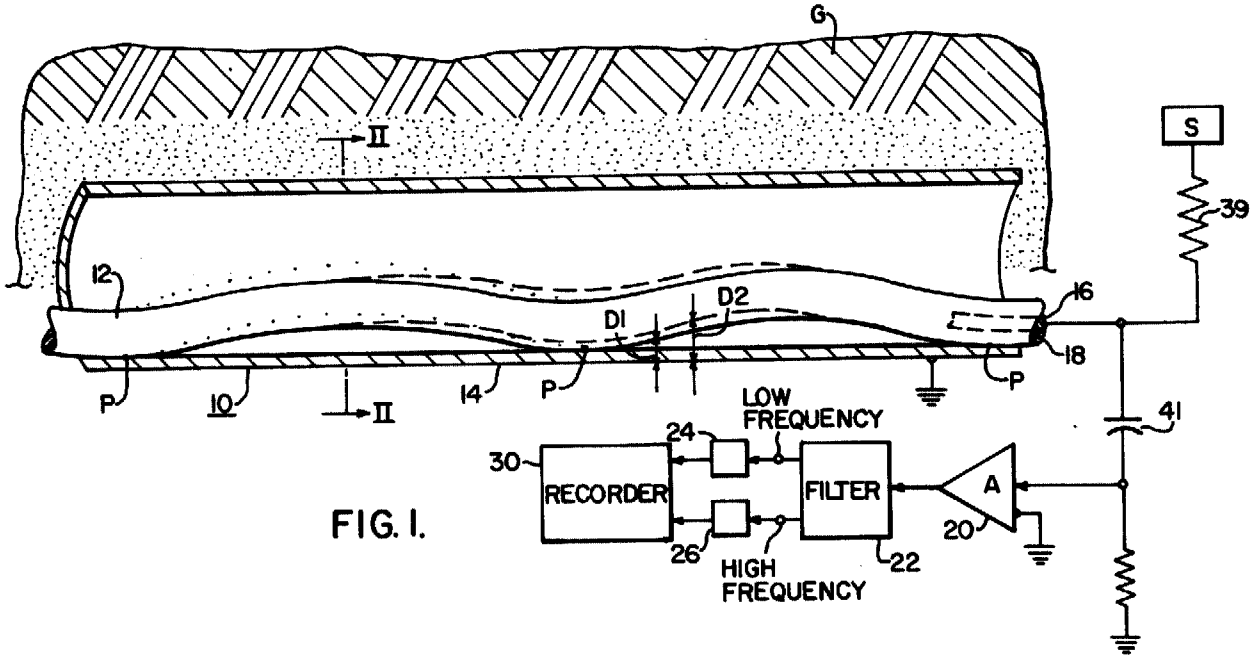
FIG. 1 is a schematic illustration of an embodiment of the invention.

While the preferred embodiment illustrated in FIG. 1 discloses a wire loosely positioned within an electrically conductive tubular member which lends itself to applications wherein the system is buried beneath the surface of the ground, it is apparent from the illustration of FIG. 5 that the invention concept is equally applicable to a flat electrically conductive member with a wire loosely positioned thereon.

Figure 2:
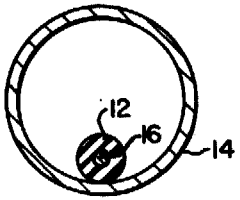
FIG. 2 is a section on the line II—II of FIG. 1.

Referring to FIGS. 1 and 2 there is illustrated a disturbance detector 10 in an embodiment for use in buried applications comprised of a wire 12 loosely positioned within a tubular member 14. The wire 12 consists of an electrical conductor 16 and an insulating coating 18. The selection of the wire for use in the disturbance detector 10 can be such as to take advantage of the electret characteristic of some commercially available wire. Some insulating materials used in coating electrical wire exhibit an electret effect. Evaluation of numerous commercially available wire material indicates that the most significant electret signal is derived from a TEFLON coated electrical conductor. The tubular member 14 is constructed from an electrically conductive material such as a metal or a metalized plastic. The tube member 14 is connected to ground and the conductor 16 of the wire 12 is electrically connected to amplifier 20 which in turn is connected to a signal processing circuit 30.

Figure 3:
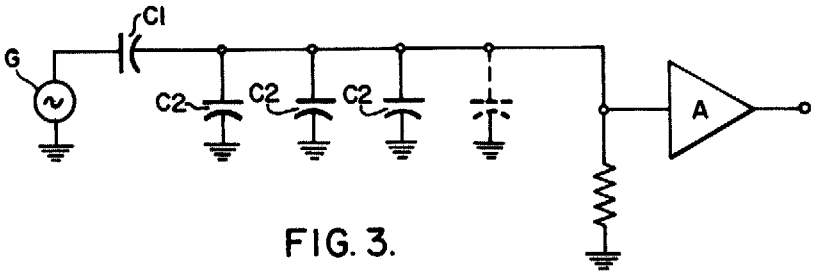
FIG. 3 is an electrical equivalent circuit of the embodiment of FIG. 1.

An electrial equivalent circuit of the embodiment of FIG. 1 is illustrated in FIG. 3. The signal source voltage source, be it the electret characteristic or a d-c bias voltage, is represented as a generator G, and the tube 14 and wire 12 capacitances are represented as capacitors C1 and C2.

Assuming the positioning of the disturbance detector 10 of FIG. 1 at a distance beneath the surface of the ground g, the occurrence of a disturbance on the surface of the ground resulting from personnel or vehicular movement will cause the wire 12 to be moved within the tube member 14. Two types of wire movement are represented in FIG. 1 occurring as a result of a disturbance. The wire movement represented by the dashed lines corresponds to displacement of the wire 12 from the tube contacting points P produced by deflection of the tube 14 in response to the pressure applied to the surface of the ground. The second movement of the wire 12 in response to a disturbance is represented by the dotted lines of FIG. 1 wherein the portions of the wire 12 between the contacts points P undergoes an acceleration mode of vibratory mode of movement due to be mechanical shock introduced by the disturbance.

The inside diameter of the tube member 14 is selected to be significantly larger than the outside diameter of the wire 12 such as would be represented by a quarter-inch copper tube and a No. 22 gauge wire. The positioning of the wire 12 within the tube 14 as illustrated in FIG. 1 locates the wire in a near wall relationship with one portion of the tube 14 such that a portion of the wire 12 adjacent to the contact point P establishes minimum distance D1 between the wire 12 and the near wall of the tube member 14. Since the minimum distance (air gap) provides a maximum capacitance, very small displacement of the wire relative to the near tube wall provides maximum capacitance modulation and in turn maximum signal voltages which are applied to the amplifier 20. In areas along the wire where the air gap is significantly larger, the same mechanical displacement of the wire 12 provides a much smaller capacitance change since the wire to the tube wall capacitance is much smaller and thus the proportional change in this capacitance is also much smaller. It is therefore obvious that for this detector configuration, the capacitance between the wire 12 and the far wall of the tube wall 14 is negligible. The distance between the wire 12 and the tube wall 14 as defined by D1 corresponds to the wire in a rest condition whereas the distace D2 corresponds to a typical displacement of the wire in response to a disturbance.

The signal produced as a result of a relative movement of the insulating material of the wire 12 relative to the conductive members corresponding to the tube 14 and electrical conductor 16 exhibits a low frequency and high frequency component. The low frequency component is a function of the displacement of the wire as illustrated by the dashed lines while the high frequency component corresponds to the dotted portion of the illustration of FIG. 1. The low frequency component is typically in the range of 0.1–10 hz. while a typical high frequency range corresponds to 10–100 hz. The output of the amplifier 20 is applied to a filter circuit 22 which effectively isolates the low frequency and high frequency components and applies the respective components through signal attenuating circuit 24 and 26 to a monitoring device herein represented as recorder 30. The high frequency component of the output signal of the detector circuit 10 is determined by the distance between the contact points P and the mass per unit length of the wire.

The isolation of the low frequency and high frequency component of the output signal permits independent monitoring of the components. It has been determined experimentally that the low frequency component provides characteristic information under certain operating conditions while the high frequency component provides information under other operating conditions. The use of the attenuating circuits 24 and 26 provides control of the relative weight attributed to the low frequency and high frequency components depending on the operating conditions to which the detector 10 is subjected.

For instance, it may be desirable to vary the relative sensitivity of the recorder 30 to the low frequency and high frequency components of the output signal under varying weather conditions. It has been determined experimentally that in underground installations of the detector 10, wherein the ground is frozen, the high frequency component reflects too wide a sensitive range to be effective while the low frequency component provides a relatively clear indication of intrusion disturbance. Under these conditions therefore the circuits 24 and 26 would be adjusted such that recorder 30 would respond primarily to the low frequency component of the signal developed by the detector 10. On the other hand, under high wind conditions it has been determined experimentally that less false alarms are recorded when monitoring the high frequency component of the detector signal. Under high wind conditions, detector systems utilizing a low frequency output signal such as the system in the above-identified patent, are sensitive to wind pressure changes on the ground which adversely affect the accuracy of the detector signal.

While the signal processing circuit 30 has been shown to consist of basic components which clearly indicate a typical utilization of the detector 10, it is apparent that the signal processing circuit illustrated can be replaced with a far more sophisticated electronic system which could cause automatic adjustment of the sensitivity of a monitoring device to the low and high frequency components of the detector device in response to changing conditions.

As mentioned earlier the mechanism for developing the detector signal can be based solely on the electret characteristic of the wire or solely on the application of a remote d-c bias signal or on the combination of the electret characteristic and the d-c bias signal depending on the particular application of the detector device. For instance in a buried application requiring extensive length of the detector device it may be neccessary to include an external d-c bias source to provide an adequate signal output. A typical application of a d-c bias voltage source is illustrated in FIG. 1. A voltage source S is applied to the conductor 16 through a high impedance device 40. Isolation of the bias voltage from the amplifier 20 is provided by capacitor 42.

Figure 4:
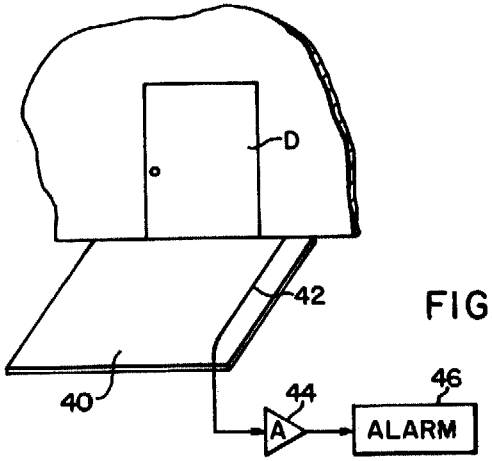
FIG. 4 is an alternate embodiment of the invention disclosed in FIG. 1.

Referring to FIG. 4, there is illustrated an alternate embodiment of the detector device of FIG. 1. In place of the tube member 14 illustrated for the buried application of the detector device 10 of FIG. 1, there is illustrated a flat electrically conductive plate 42 positioned relative to the entrance to the door D and having disposed thereon an electrical wire 42. Once again the wire 42 as in the case of the wire 12 of the embodiment of FIG. 1 is loosely positioned relative to the electrically conductive member 40 such that impact by an intruder on the surface of the conductive member 40 will cause displacement of the wire 42 relative to the plate 40 thus producing an electrical signal in accordance with the operation described above. Amplifier 44 responds to the electrical signal by activating alarm circuit 46. The embodiment of FIG. 4 is disclosed to clearly indicate that the inventive concept is not limited to the use of a tubular member as illustrated in FIG. 1, but rather extends to the basic concept of using an electrical wire loosely positioned relative to a conductive surface to develop an electrical signal in response to the change in capacitance produced by displacement of the wire relative to a conductive member.

Results of impact sensitivity tests of detectors utilizing wires of different sizes and insulation and tubes of different diameters are presented in the following tabulation. It appears from the tabulation that clear insulated TEFLON wire is probably better for a detecting device utilizing electret characteristics of the wire than a pigmented wire of a similar type. It also appears that there is a minimum inside tube diameter that will accommodate a particular wire size and still generate acceptable electrical signals.

| Wire Description | | | Capacitance Pf/ft | Normalized Signal MVPP | Tube Diameters |
|---|---|---|---|---|---|
| No. 20 Teflon | flex wire | blue | 20 | 275 MV | |
| No. 20 P V C | " | green | 26 | 50 MV | |
| No. 24 Teflon | " | blue | 16 | 275 MV | 25" OD |
| No. 22 Teflon | " | red | 18 | 220 MV | 176" ID |
| No. 30 Teflon | " | — | — | 275 MV | |
| No. 22 Teflon | " | clear | 18 | 330 MV | |
| No. 22 Teflon | " | red | 25.5 | 26 MV | |
| No. 30 Teflon | " | — | 15 | 275 MV | 125" OD |
| No. 20 Teflon | " | blue | — | 31 MV | 085" ID |
| No. 24 Teflon | " | blue | — | 275 MV | |

I claim:

[1. Apparatus for monitoring disturbances caused by mechanical shock, pressure, impact, etc., comprising in combination, a substantially rigid first electrically conductive member adapted to respond to disturbances, a second electrically conductive member disposed in a loose fitting, intermittent contacting relationship with said first electrically conductive member and being mechanically free to move with respect to said first electrically conductive member, electrical insulating material disposed between said first and second electrically conductive members to establish a capacitance therebetween, disturbance of said substantially rigid first electrically conductive member resulting in mechanical displacement of said second electrically conductive member with respect to said first electrically conductive member, the displacement producing a change in said capacitance.]

[2. Apparatus as claimed in claim 1 wherein said insulating material exhibits an electret characteristic, said electret characteristic providing an electrical charge.]

3. Apparatus as claimed in claim [1] *13* further including a d-c voltage source operatively connected to said electrically conductive members to establish an electrical charge on said insulating material.

[4. Apparatus as claimed in claim 1 wherein the change in capacitance produced due to the displacement of the second electrically conductive member with respect to the first electrically conductive member is manifested by the development of an electrical signal, said electrical signal consists of a low frequency component corresponding to the capacitance change produced by separation of said first electrically conductive member from said second electrically conductive member and a high frequency component corresponding to the vibration of said second electrically conductive member.]

[5. Apparatus as claimed in claim 1 wherein said first electrically conductive member includes a sheet of electrically conductive material, and said second electrically conductive member is a wire resting loosely on said sheet of electrically conductive material with said electrical insulating material disposed therebetween.]

[6. In an intrusion detection system for responding to disturbances, the combination of a substantially rigid tubular member exhibiting electrical conductivity characteristics, a flexible, loose fitting electrical conductor having an effective diameter which is substantially less than the inside diameter of said tubular member and being disposed witin said tubular member in an intermittent contacting relationship with an interior surface of said tubular member so as to be substantially closer to one interior surface of the tubular member than to the opposite interior surface of the tubular member, electrical insulating material disposed between said tubular member and said flexible electrical conductor to establish a capacitance therebetween, a disturbance causing displacement of the loosely positioned flexible electrical conductor relative to said substantially rigid tubular member causing a change in said capacitance, said change in capacitance resulting in the development of an electrical signal indicative of the disturbance.]

7. Apparatus as claimed in claim [6] *14* wherein said electrical insulating material is a coating on said flexible electrical conductor, the effective diameter of the combination of said flexible electrical conductor and the coating of electrical insulating material being substantially less than the inside diameter of said tubular member.

[8. Apparatus as claimed in claim 7 wherein the insulating material coating exhibits an electret characteristic.]

9. Apparatus as claimed in claim [7] *14* including a d-c voltage source operatively connected to said flexible electrical conductor and said tubular member to establish a charge condition in said insulating material.

[10. Apparatus as claimed in claim 6 wherein said electrical signal is comprised of a low frequency and high frequency component, wherein said low frequency component corresponds to the change in capacitance produced by the displacement of said wire element relative to said tubular member in response to said disturbance and said high frequency component corresponds to the vibration of said wire element relative to said tubular member in response to said disturbance.]

[11. Apparatus as claimed in claim 6 wherein said flexible electrical conductor is a wire.]

*12. Apparatus as claimed in claim 14 including, circuit means responsive to said first frequency and second frequency signal components for weighting said first frequency and second frequency signal components and producing an output signal indicative of a combination of predetermined weighted representations of said first frequency and second frequency signal components.*

*13. Apparatus for monitoring disturbances caused by mechanical shock, pressure, impact, etc., comprising in combination, a substantially rigid first electrically conductive member adapted to respond to disturbances, a second electrically conductive member disposed in a loose fitting, intermittent contacting relationship with said first electrically conductive member and being mechanically free to move with respect to said first electrically conductive member, electrical insulating material disposed between said first and second electrically conductive members to establish a capacitance therebetween, a disturbance of said substantially rigid first electrically conductive member resulting in a mechanical displacement and a mechanical vibration of said second electrically conductive member with respect to said first electrically conductive member, said mechanical displacement and mechanical vibration producing a change in said capacitance, said change in capacitance being manifested by the development of an electrical signal, said electrical signal consisting of a first frequency component corresponding to the capacitance change produced by said mechanical displacement of said second electrically conductive member and a second frequency component corresponding to the mechanical vibration of said second electrically conductive member, and circuit means responsive to said electrical signal.*

*14. In an intrusion detection system for responding to disturbances, the combination of a substantially rigid tubular member exhibiting electrical conductivity characteristics, a flexible, loose fitting electrical conductor having an effective diameter which is substantially less than the inside diameter of said tubular member and being disposed within said tubular member in an intermittent contacting relationship with an interior surface of said tubular member so as to be substantially closer to one interior surface of the tubular member than to the opposite interior surface of the tubular member, electrical insulating material disposed between said tubular member and said flexible electrical conductor to establish a capacitance therebetween, a disturbance causing a mechanical displacement and a mechanical vibration of said loosely positioned flexible electrical conductor relative to said substantially rigid tubular member, said mechanical displacement and mechanical vibration of said loosely positioned flexible electrical conductor causing a change in capacitance, said change in capacitance resulting in the development of an electrical signal including a first frequency component produced by said mechanical displacement and a second frequency component produced by said mechanical vibration, and circuit means responsive to said electrical signal for identifying said disturbance.*

* * * * *